United States Patent Office 3,516,795
Patented June 23, 1970

3,516,795
ANALYSIS OF ACRYLATE POLYMERS
Andrew G. Tsuk, Laurel, and Thomas E. Ferington, Sandy Spring, Md., and Sheldon B. Markofsky, Cambridge, Mass., assignors to W. R. Grace & Co., New York, N.Y., a corporation of Connecticut
No Drawing. Filed Apr. 8, 1968, Ser. No. 719,693
Int. Cl. G01n 31/02, 33/18
U.S. Cl. 23—230
12 Claims

ABSTRACT OF THE DISCLOSURE

A process for quantitatively determining the concentration of parts per million quantities of water soluble acrylate polymers in aqueous systems by precipitating a cupric polyacrylate floc. The method of the invention includes the steps of adding cupric ions to an aqueous solution of acrylate polymer, said solution having been adjusted to a pH value above about 3 and up to about 8, and determining the amount of polymer from the floc formed in the solution mixture.

---

This invention relates to a process for quantitatively determining the concentration of water soluble polymers in aqueous solutions.

In summary, this invention is a process for quantitatively determining the amount of water soluble polymer dissolved in an aqueous solution, said polymer having repeated groups with the general formula

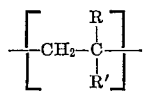

where R is H or a methyl group and R' is a carboxylic acid group or water soluble salts thereof. The process comprises the steps of mixing a water soluble cupric salt with an aqueous solution of 0.3 to 500 p.p.m. of the polymer, said solution having a pH greater than about 3 but less than about 8, and determining the amount of polymer from the floc formed in the solution mixture.

Acrylate and methacrylate polymers are used extensively in aqueous systems, such as cooling water towers, seawater evaporators, boilers, and furnaces to prevent the formation of scale and the accumulation of mud and silt. Very small concentrations, i.e., 0.3 to 500 p.p.m. of acrylate polymers are effective in maintaining these aqueous systems clean.

However, it is necessary to periodically determine the concentration of acrylate polymers present in the aqueous systems in order to continue proper water treatment. Prior to this invention, processes used to determine low concentration of acrylate polymers were very complicated, expensive, required days to complete, and often failed because of interference with other components in the waters.

Accordingly, it is the object of this invention to provide a simple, inexpensive method of determining concentrations to within 0.3 to 500 p.p.m. of water soluble polymers in water used in boilers, cooling water towers, seawater evaporators, furnaces, and other similar uses. It is a further object of this invention to provide a method of determining the concentration of water soluble polymers which can be adapted to industrial use and performed by a technician within a few hours.

It has been found that by adding cupric ions to an aqueous solution of water soluble polymers, extremely small amounts of said polymer can be quantitatively determined from the macroscopic flock which forms.

Water soluble polymers which can be quantitatively analyzed by the method of this invention are, in general, polymers with repeated groups having the formula

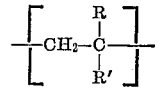

where R is H or a methyl group and R' is a carboxylic acid group or water soluble salts thereof.

The water soluble polymers which can be quantitatively analyzed by the method of this invention include the polymers of acrylic acid, the alkali metal and ammonium salts of acrylic acid, methacrylic acid, the alkali metal and ammonium salts of methacrylic acid. These polymeric compositions may be homopolymers or they may be copolymers with other copolymerizing monomers, such as ethylene, propylene, isobutylene, styrene, α-methylstyrene, vinyl acetate, vinyl formate, alkyl ether, acrylonitrile, methacrylonitrile, vinyl chloride vinylidene chloride, the alkyl acrylates, the alkyl methacrylates, the alkyl maleates, and the alkyl fumarates, and other olefin monomers copolymerizable therewith. The copolymers of this type, having at least 50 mole percent of the acrylic or methacrylic acid derivatives, are preferred, and especially when the comonomer is hydrophobic or has no ionizable groups. Polymers of this type may be prepared directly by the polymerization of suitable monomers, or by the after-chemical reaction of other polymers, for example, by the hydrolysis of acrylonitrile or methacrylonitrile polymers.

The various types of polymers suitable for the practice of this invention are ethylenic polymers having numerous side chains distributed along a substantially linear continuous carbon atoms molecule. The side chains may be hydrocarbon groups, carboxylic acid groups or derivatives thereof, sulfonic acid groups or derivatives thereof, phosphoric acid or derivatives thereof, heterocyclic nitrogen groups aminoalkyl groups, alkoxy radicals and other organic groups, the number of which groups and the relative proportions of hydrophilic and hydrophobic groups being such as to provide a water-soluble polymeric compound having substantially large numbers of ionizable radicals. The length of the said continuous carbon chain must be such as to provide compounds having a weight average molecular weight of at least 1000.

Among the various polymers as described above and water-soluble salts thereof useful in the practice of the present invention, there may be mentioned hydrolyzed polyacrylonitrile and polyacrylamide, sulfonated polystyrene, acrylamide-acrylic acid copolymers, polyacrylic acid, ½ calcium salt of hdrolyzed 1:1 copolymer of vinyl acetate-maleic anhydride, hydrolyzed styrene-maleic anhydride copolymer, ammonium polyacrylate, sodium polyacrylate, ammonium polymethacrylate, sodium polymethacrylate, diethanolammonium polyacrylate, guanidinium polyacrylate, dimethyl-aminoethyl polymethacrylate, acrylamide-acrylonitrile copolymer, methacrylic acid-dimethylaminoethyl methacrylate copolymer, sodium polyacrylate-vinyl alcohol copolymer, hydrolyzed methacrylic acid-acrylonitrile copolymer, vinyl acetatemaleic anhydride copolymer, vinyl formate-maleic anhydride copolymer, vinyl methyl ether-maleic anhydride copolymer, isobutylenemaleic anhydride copolymer, styrene-maleic anhydride copolymer, ethyl acrylate-maleic anhydride copolymer, vinyl chloride-maleic anhydride copolymer, hydrolyzed acrylonitrile vinyl acetate copolymer, hydrolyzed acrylonitrile-methacrylonitrile copolymer, hydrolyzed acrylonitrile-methacrylonitrile-vinyl acetate terpolymer, hydrolyzed acrylonitrile-methacrylic acid copolymer, vinyl pyridine-acrylonitrile copolymer, etc.

Water soluble polymers for which this method is especially useful are water-soluble polyacrylic acid, polymethacrylic acid, acrylic acid-methacrylic acid copolymers, partially hydrolyzed polyacrylamide and partially hydrolyzed polymethacrylamide.

Careful control of pH is important in the process of this invention. The pH range required for cupric polyacrylate flocculation is above about 3 and up to about 8. The preferred pH range is from about 3 to about 5.5. In strongly acid solutions, below about pH 3, no floc or precipitate forms. At pH values of about 5.5 and above, cupric hydroxide begins to precipitate and mask the cupric polyacrylate floc, thus interfering with the quantitative determination of acrylate polymer. At pH's above about 8, the copper predominantely precipitates as the hydroxide, preventing analysis of copper polyacrylate.

The pH of the solution also influences the composition of the floc. A steep increase in copper content of the floc results with increase in pH.

The concentration of acrylate polymer in the solution can be determined by measuring the time necessary for appearance of visible floc under defined conditions of temperature and stirring, and then estimating the concentration of the acrylate polymer by means of a calibration curve obtained under the same conditions with the same acrylate polymer at a number of different concentrations. At room temperature, the coagulation of the cupric polyacrylate floc is very slow. However, it can be accelerated by raising the temperature of the solution to the range of about 70° C. to boiling. At 90° C., thirty to sixty minutes are needed to get a visible floc in a solution containing one p.p.m. acrylate polymer of about 90,000 molecular weight, whereas a concentration of 10 p.p.m. gives a floc within 3 minutes. If the time of the first visible floc formation is used as a measure of polymer concentration, heating to less than boiling is preferred.

The unknown concentration of the acrylate polymer can also be estimated from the total quantity of floc formed by visually comparing the volume of settled floc to a standard series precipitates prepared from a series of solutions containing known concentrations of the polymer.

Both the visual processes can be aided by mixing a few parts per million of colloidal carbon into the system before adding the copper compound, whereby a black flow which is easier to see will be formed.

The concentration of the polymer can be estimated with greater accuracy by determining the amount of copper in the floc, and converting the copper concentration to equivalent acrylate polymer concentrations. The floc can be analyzed for copper by filtering and washing the floc, dissolving it in i.e. dilute hydrochloric acid or dilute ammonium hydroxide solution and then analyzing it colorimetrically for copper by known standard procedures.

In the process of this invention, the aqueous solutions containing acrylate polymers should be substantially free from interfering concentrations of interfering compounds, such as, concentrations of over 80 p.p.m. of phosphate or citrate salts, ad high concentrations of citric, phthalic, formic, monochloroacetic sulfonilic and sulfurous acids.

Lignosulfonates, if present in the system, co-precipitate with the cupric polyacrylate. Therefore, in order to quantitatively determine the correct concentration of polyacrylate, the floc must be analyzed for copper, and then the copper content converted to equivalent acrylate polymer concentration with appropriate corrections for the amount of copper carried down with the lignosulfonate.

This invention is further illustrated by the following specific but non-limiting examples.

EXAMPLE 1

A 100 ml. aliquot of simulated boiler water containing an "unknown" amount of polyacrylic acid, average molecular weight 92,000, and 3 known solutions containing 10, 3 and 1 p.p.m. of said polymer, respectively, were brought to pH 3.2 with HCl. The samples were heated to near boiling, then 2 ml. of $Cu(NO_3)_2$ solution (150 g./l., filtered) was added to each. Flocculation was monitored by observation of a beam of light shining transversely through the beaker.

Distinct flocs appeared after 2 minutes in the 10 p.p.m. sample. After 20 minutes, a floc was discernible in the 3 p.p.m. sample. Small flocs appeared in the 1 p.p.m. sample after an hour. The unknown gave visible floc in 2 minutes. Therefore, the acrylate polymer content of the unknown was estimated to be of the order of 10 p.p.m. The accuracy of this result was verified by other techniques.

EXAMPLE 2

A 100 ml. sample of seawater brine treated with an "upknown" amount of sodium polymethacrylate, average molecular weight of 10,000, was poured into a 150 ml. beaker. Samples of seawater brine with known levels of sodium polymethacrylate (0, 1, 2 and 4 p.p.m.) were prepared to be measured alongside with the unknown. The pH of each sample was brought to pH 3.2 with 1 N HCl. The samples were heated to a temperature above 90° C. and 2 ml. of a $Cu(NO_3)_2$ solution, (150 g./l. filtered) was added to each with stirring. Moderate heating was continued for an hour, then the samples were set aside overnight. The sample without sodium polymethacrylate contained no floc, whereas the other samples formed fluffy blue precipitates. The samples with 1, 2 and 4 p.p.m. sodium polymethacrylate contained noticeably different and increasing amounts of floc. The unknown contained about as much as the 2 p.p.m. sample. The polymethacrylate content of the unknown was therefore visually estimated as 2 p.p.m. The accuracy of this result was verified by other techniques.

EXAMPLE 3

Calibration curves were prepared by the following technique: Filtered 100 ml. aliquots of a simulated boiler water were placed in 150 ml. beakers then acidified to a pH of exactly 3.2 with HCl, 1 N. Varying amounts of polyacrylic acid were added. The beakers were heated to about 70° C. or higher, then 1.0 ml. of a $Cu(NO_3)_2$ solution (150 gms. per liter, filtered, pH about 3.9) was added with stirring. The samples were then removed from the heat, and were allowed to stand for 1–2 hours with occasional, gentle stirring. The floccular precipitate was filtered by suction through an asbestos mat, then washed on the filter with 10 ml. of a 9:1 denatured alcohol-water mixture. The receiver was changed, and 50–70 ml. $NH_4OH$, about 0.09 N, was passed through under suction to dissolve the precipitate. To this filtrate 3.0 ml. of a freshly prepared sodium diethyldithiocarbamate solution, 11 gms. per liter, was added, then made up to 100 ml. with distilled water. The optical density of this solution was then measured at 450 m$\mu$ against a blank prepared of the ammonia and sodium diethyldithiocarbamate solutions.

The following optical densities were obtained with ½ inch optical cells:

| Added polyacrylate (p.p.m.): | Optical density at 450 m$\mu$ |
|---|---|
| 0 | 0.012 |
| 2 | 0.035 |
| 4 | 0.094 |
| 6 | 0.142 |
| 8 | 0.201 |
| 10 | 0.263 |

Three samples of simulated boiler water were prepared and 4.0, 7.2 and 1.8 p.p.m. polyacrylic acid was added. These samples were processed exactly as in the above example, by an operator who did not know what quantities of acrylate polymer had been added. He obtained the following optical densities, respectively: 0.069, 0.210 (average of two determinations) and 0.046 (average of two determinations). Linear interpolation of these between neighboring values of the above calibration curve gave values for the unknowns as follows: 3.2 p.p.m., 8.2 p.p.m. and 2.4 p.p.m.

EXAMPLE 4

The procedure of Example 1, when followed with water containing 1, 5, 10, 20, 50, 100 and 500 p.p.m. of the following polymers and mixtures thereof accurately indicated the polymer concentrations:

(1) Partially hydrolyzed polyacrylamide (M.W.—25,000)
(2) Sodium polyacrylate (M.W.—25,000)
(3) Partially hydrolyzed polymethacrylamides (M.W.—50,000)
(4) Polyacrylic acid (M.W.—100,000)
(5) Polymethacrylic acid (M.W.—150,000)
(6) Acrylic acid-methacrylic acid copolymers (M.W.—150,000)

Obviously, many modifications and variations of the invention as hereinabove set forth can be made without departing from the essence and scope thereof, and only such limitations should be applied as are indicated in the claims.

We claim:

1. A process for determining the concentration of a dissolved polymer in aqueous solutions, the polymer having repeated groups with the formula

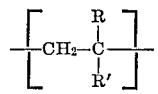

wherein R is hydrogen or a methyl group and R' is a carboxylic acid or carboxylic acid salt, comprising the steps of:
(a) mixing from 0.001 up to 5 wt. percent of a water soluble cupric salt with an aqueous solution containing from 0.3 to 500 p.p.m. of said polymer, the solution mixture having a pH of above about 3 and less than about 8,
(b) determining the amount of polymer from the floc formed in the solution mixture.

2. The process of claim 1 wherein the solution mixture is heated to from 70° C. up to boiling, floc is permitted to completely form in the mixture, and the polymer concentration is estimated from the total quantity of floc formed.

3. The process of claim 2 wherein the polymer concentration is estimated by visually comparing the volume of floc formed with the volume of floc in standard solution mixtures.

4. The process of claim 2 wherein the polymer concentration is estimated by separating the floc from the solution mixture, dissolving the separated floc in a solution of a strong acid, at least $5 \times 10^{-3}$ M, to form an aqueous solution, determining the copper concentration in the aqueous solution colorimetrically, and converting the copper concentration to equivalents of polymer to estimate the polymer concentration.

5. The process of claim 2 wherein the polymer concentration is estimated by separating the floc from the solution mixture, dissolving the separated floc in an ammoniacal solution, at least .09 N, to form an aqueous solution, determining the copper concentration in the aqueous solution colorimetrically and converting the copper concentration to equivalents of polymer to estimate the polymer concentration.

6. The process of claim 1 wherein the polymer is a member selected from the group consisting of polyacrylic acid, polymethacrylic acid, acrylic acid-methacrylic acid copolymers, partially hydrolyzed polymethacrylamide, water soluble salts thereof, and mixtures thereof.

7. The process of claim 1 wherein the solution is heated to at least 70° C. after being mixed with the cupric salt to accelerate floc formation.

8. The process of claim 1 wherein the solution pH is adjusted to provide a solution mixture pH within the range of from about 3 to less than about 8 after the cupric salt is mixed therewith.

9. The process of claim 1 wherein the solution mixture pH is adjusted to within the range from above about 3 to less than about 8.

10. The process of claim 1 wherein the solution mixture pH is within the range of from 3 to 5.5.

11. The process of claim 1 wherein the solution mixture is heated to from 70° C. up to less than boiling, and the polymer concentration is estimated from the time required for formation of the first visible floc.

12. The process of claim 1 wherein 10 to 200 p.p.m. of colloidal carbon is mixed with the solution whereby the floc formed is black and more visible.

References Cited

UNITED STATES PATENTS

| 2,729,557 | 1/1956 | Booth et al. | 75—105 |
| 2,980,610 | 4/1961 | Ruehrwein | 210—58 |
| 3,085,916 | 4/1963 | Zimmie et al. | 134—22 |
| 3,142,638 | 7/1964 | Blaisdell et al. | 210—52 |
| 3,252,899 | 5/1966 | Rice et al. | 210—54 |
| 3,418,237 | 12/1968 | Booth et al. | 210—54 |

OTHER REFERENCES

Crummett & Hummel: J. American Water Works Assoc.; 1963; 55; pp. 209–219.

Michaels & Morelos: "Polyelectrolyte Adsorption by Kaolinite," Industrial & Engineering Chemistry; vol. 47, No. 9, September 1955; pp. 1801–1809.

Ruehrwein & Ward: "Mechanism of Clay Aggregation by Polyelectrolytes," Coil Science, vol. 73; No. 6; June 1952; pp. 485–492.

Sweett & Rolfe: "Estimation of Traces of Poly(Acrylic Acid) and Other Poly(Carboxylic Acids) in Water and Salt Solids by Complexing with Methylene Blue," Analytical Chem.; vol. 38; No. 13, December 1966; pp. 1958–1959.

MORRIS O. WOLK, Primary Examiner

B. S. RICHMAN, Assistant Examiner

U.S. Cl. X.R.

210—53, 67